US007475663B2

(12) United States Patent
Calviti et al.

(10) Patent No.: US 7,475,663 B2
(45) Date of Patent: Jan. 13, 2009

(54) INTERNAL COMBUSTION ENGINE AND AN ENGINE HOUSING

(75) Inventors: Caetano M. A. Calviti, São Paulo (BR); Fausto Luiz C. S. Neves, São Bernardo do Campo (BR); Joaquim Rodrigues Neto, São Bernardo do Campo (BR)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 174 days.

(21) Appl. No.: 10/559,001

(22) PCT Filed: May 20, 2004

(86) PCT No.: PCT/BR2004/000071

§ 371 (c)(1),
(2), (4) Date: Apr. 14, 2006

(87) PCT Pub. No.: WO2004/106716

PCT Pub. Date: Dec. 9, 2004

(65) Prior Publication Data

US 2006/0213045 A1 Sep. 28, 2006

(30) Foreign Application Priority Data

May 30, 2003 (BR) .................................... 0302062

(51) Int. Cl.
*F01L 1/02* (2006.01)

(52) U.S. Cl. ................ 123/90.31; 123/90.27; 123/90.1; 123/90.6; 29/888.1; 29/888.01; 29/888.08; 29/281.5; 29/270; 269/229; 269/199; 70/182; 70/183; 70/1

(58) Field of Classification Search ............... 123/90.31
See application file for complete search history.

(56) References Cited

U.S. PATENT DOCUMENTS

| | | | | |
|---|---|---|---|---|
| 4,322,174 | A * | 3/1982 | Ishii et al. | 403/12 |
| 5,099,563 | A * | 3/1992 | Strusch | 29/281.5 |
| 5,845,397 | A * | 12/1998 | Reedy et al. | 29/888.011 |
| 5,950,294 | A * | 9/1999 | Gibbs | 29/281.5 |

* cited by examiner

*Primary Examiner*—Thomas E Denion
*Assistant Examiner*—Kyle M Riddle
(74) *Attorney, Agent, or Firm*—Jack D. Nimz; Jeffrey P. Calfa

(57) ABSTRACT

The invention relates to an internal combustion engine (1) comprising a housing (2) having at least one opening (4) into its inside, which is preferably the engine-oil feed inlet, and with a camshaft (5), mounted inside the housing for rotation about its geometric shaft. The camshaft (5) and the housing (2) have means cooperating with each other and with a device for locking a turnable shaft (6) with respect to the housing, insertable through this opening. In a second embodiment of the present invention, the device consists of a rod (6), the cooperating means in the housing consist in a bore (7) for receiving an end of the rod (6), and the cooperating means on the cam shaft consist of a notch (9) made in the surface of the shaft, which cooperates with the rod. In this way, when there is a need to adjust, repair and/or replace engine (1) components, the rod (6) is inserted through the opening (4) and locked in this bore (7) of the housing (2). In this position, the rod functions as a stop against said notch (9) in the plane surface of the camshaft (5), preventing it from turning about its axis. When this operation is finished, said rod (6) is removed from the housing (2) through the oil-feed opening (4), and the shaft (5) is unlocked. Additionally, the present invention relates to an engine housing (2), preferably for use with an internal combustion engine (1).

3 Claims, 4 Drawing Sheets

4
2
6
7
8
5
8

FIG. 3
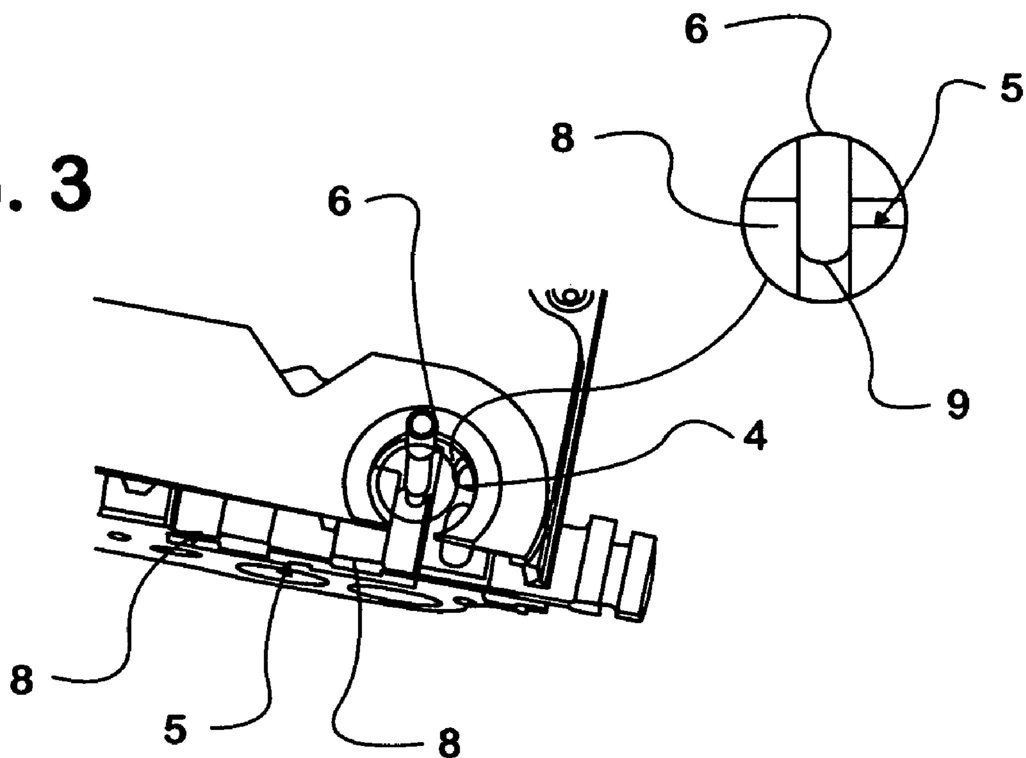
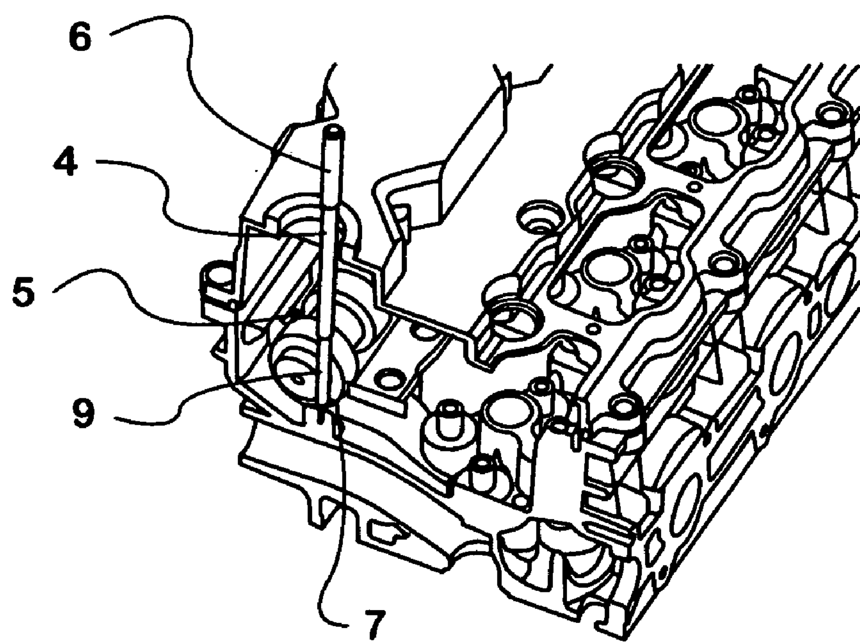
FIG. 4

5
9
6

7

5
6
10

7

INTERNAL COMBUSTION ENGINE AND AN ENGINE HOUSING

FIELD OF THE INVENTION

The present invention relates to internal combustion engine.

DESCRIPTION OF THE PRIOR ART

As it is known from the prior art, 4-stroke internal combustion engines perform fuel-burning cycles with fuels such as, for example, the Otto Cycle or the Diesel Cycle, to generate mechanical energy. Such cycles occur within combustion chambers, where pistons driven by the explosion of air-fuel mixture transmit the mechanical energy to a crankshaft, which changes it into rotational movements.

In order to enable mixtures with fuels and/or gases to go into or out of the combustion chambers in the correct steps throughout these cycles, valves arranged in these chambers should operate in synchrony with the other components of the engine (pistons and crankshaft, injection system, etc.).

The job of actuating valves and keeping them synchronized with all the other components of the engine is carried out by the camshaft, which has cams arranged in different positions (with respect to each other), so that the cams will actuate the valves, when the shaft is in rotation. Just to establish the functioning of this shaft, said rotation is preferably driven by a distribution belt (or any other coupling device, such as chain(s) or gears connected to the crankshaft, which, as already said, transmits a rotational movement. The system comprised by camshaft, belts/chain(s)/gears and the respective pulleys, if any, is called distribution system of the engine.

In order to carry out the combustion cycles, it is necessary for the camshaft (and consequently the valves) to be correctly synchronized with the other components or the engine (pistons, crankshaft, pump, fuel-injection system, etc.). Otherwise, when the shaft is turning, its cams may actuate the valves in an incorrect timing, incorrectly allowing fluids or gases to get into or out of the combustion chamber, which impairs the performance of the cycle and, in the most severe cases, might cause damages to the engine.

When effecting adjustments, repairs and/or replacement of engine components (so that the shaft and the other components of the engine will again function in a synchronized manner), there is the risk of an inadvertent rotation of the camshaft occurring and the consequent and undesirable desynchronization of the valves with respect to the other components of the engine. So, at the end of the operation, there is always the need to check whether the shaft has turned or not and, if so, it should be adjusted again (its position should be corrected), so that the engine will work correctly.

There are some methods in the prior art that are used for effecting this alignment of the shaft, in order to achieve synchronization between the valves and the other engine components, which should not be unconfigured during the services of engine maintenance.

A method that has been employed consists in using visual markings on both the shaft and the other stationary engine component with respect to it (for instance, the engine housing), so that, before mounting the engine (at the end of the operation), the marking on the shaft is aligned with the marking on the stationary component, in order to achieve the correct synchronization of the valves with the other engine components. It is observed that this method is carried out with the engine at least partly disassembled.

The main drawback of this system consists in the fact that there is no means or device for preventing the camshaft from moving, but rather, due to the markings, it is possible to notice that it moves, and so one can position it so as to establish the synchronization position of the distribution system.

As another drawback, one should note the fact that, as a rule, the markings are located at points of difficult access and often covered with oil, grease and all kinds of dirt, which greatly makes it difficult to view them. The difficulty in viewing the markings correctly is increased, in many cases, by the phenomenon of parallax errors (the error committed in reading a graduated scale, as a result of the fact that the visual rays that reach the two eyes of the observer are not perpendicular to the scale plane). So, there is the possibility of the makings between the elements not being coincident any longer (configuring the loss of synchronization), but all seems to be correct in the eyes of those who observe the markings.

Additionally, it is necessary to make a great effort to reach the engine manually, in order to align the referred-to markings at the time of the maintenance in question.

Another method that is much employed corresponds to the locking of the pulleys related to the camshaft (s), during the repair or adjustment of the engine, for the purpose of preventing it from turning and the consequent unsynchronized functioning of the valves with respect to the other engine components. In such operations, one basically uses elastic pins, screws or other locking devices to lock the pulleys, by mechanical interference. However, at the time of carrying out this second method, there is the risk of the valves remaining unsynchronized, since errors may be committed when one positions this locking device, due to manufacture tolerances, such as deviation in the positioning of key slots, deviation in the positioning of the pin-fitting bores with respect to the alignment of the camshaft, etc.

In addition to the need for these special locking devices, there is the drawback that one should promote the partial disassembly of the engine in order to have access to the pulley(s) of the camshaft(s) and of the crankshaft. As a rule, this partial disassembly corresponds to the withdrawal of driving fan belts and water-pump belts, belts that drive peripheral systems such as air-conditioners and hydraulic driving, pulley protection covers and sometimes even the vehicle radiator, in order to bring about the correct access to the pulleys and their lock.

Therefore, it has been found that, until the present moment, no system or component had been developed for bringing about the synchronism of the distribution system of an internal combustion engine without the need to disassembly the engine at least partly.

OBJECTIVES OF THE INVENTION

One objective of the present invention is to provide an internal combustion engine with a device for locking the camshaft, without the need to disassemble it totally or at least partly.

Another objective of the invention, directly connected to the first one, is to provide an internal combustion engine, preferably a 4-stroke engine that enables one to carry out adjustments, repairs, disassembly and replacement of components, without the need to verify and adjust the synchronism of the camshaft with respect to the crankshaft at the end of the operation.

SUMMARY OF THE INVENTION

The objectives of the present invention are achieved by means of an internal combustion engine comprising a housing provided with at least one opening to its interior and at least one turnable shaft, mounted inside the housing, the turnable shaft and the housing having means cooperating with a device for locking a turnable shaft that may be inserted through said opening, to lock the shaft with respect to the housing.

Also, the objectives of the present invention are achieved by means of an engine housing to which at least one turnable shaft is associable, the housing being provided with means cooperating with a device for locking the turnable shaft, to lock the shaft with respect to it.

At the time of making adjustment, repair, disassembly and/or replacement of engine components, this locking device is inserted through that opening, in the cooperating means of the shaft and of the housing, preventing the shaft from turning while the crankshaft remains in the same position and, consequently, preventing that the opening and closing of the valves remain unsynchronized with respect to the movements of the engine components throughout the operation.

In an embodiment of the present invention, the locking device comprises a rod, the cooperating means in the housing are comprised of a bore for receiving one end of the rod, and cooperating means on the camshaft are comprised of a notch made on the surface of the shaft, which cooperates with the rod. In this way, prior to the operation of adjusting, repairing and/or replacing engine components, the rod is inserted through the oil-feeding opening and locked in this housing bore. In this position, the rod functions like a stop against said notch on the plane surface of the camshaft, preventing it from turning about its axis. When this operation is finished, said rod is withdrawn from the housing through the oil-feed opening, and the shaft is unlocked.

One can see that the present invention provides means for the camshaft to remain locked throughout operations of adjustment, repair and/or replacement of engine components, thus minimizing the chances of the shaft turning and, consequently, the loss of synchronization of the valves with respect to the other engine components. Moreover, by virtue of the fact that the locking device is inserted in the engine through the housing opening, there is no need to disassemble it (even partly) to effect this locking.

In spite of the above example, the concept of the present invention embraces other embodiments, being limited only by the contents of the accompanying claims, which include the possible equivalents.

BRIEF DESCRIPTION OF THE DRWAINGS

The present invention will now be described in greater detail with reference to embodiments represented in the figures, which show:

FIG. 3 illustrates a top view of the detail of FIG. 2;

FIG. 4 illustrates a second view in detail of the internal portion of the engine illustrated in FIG. 1;

DETAILED DESCRIPTION OF THE FIGURES

As can be seen in FIGS. 1-6, described above, a preferred embodiment of the present invention comprises a 4-stroke engine that operates under the Diesel Cycle, that is to say, the engine aspirates and compresses air at high compression rates and the injectors inject the Diesel oil under pressure into the combustion chambers, where it ignites and explodes due to contact with the highly compressed and heated air. The expansion of the gases generated by the explosion move the pistons linearly, thus generating mechanical energy, which is later transmitted to a crankshaft, which converts the linear movements of the pistons into a rotational movement.

Although a 4-stroke Diesel engine is used in this preferred embodiment, described now, other internal combustion engines might be used, without departing from the scope of the present invention, as for example internal combustion engines that function under the Otto Cycle.

Figure 1:
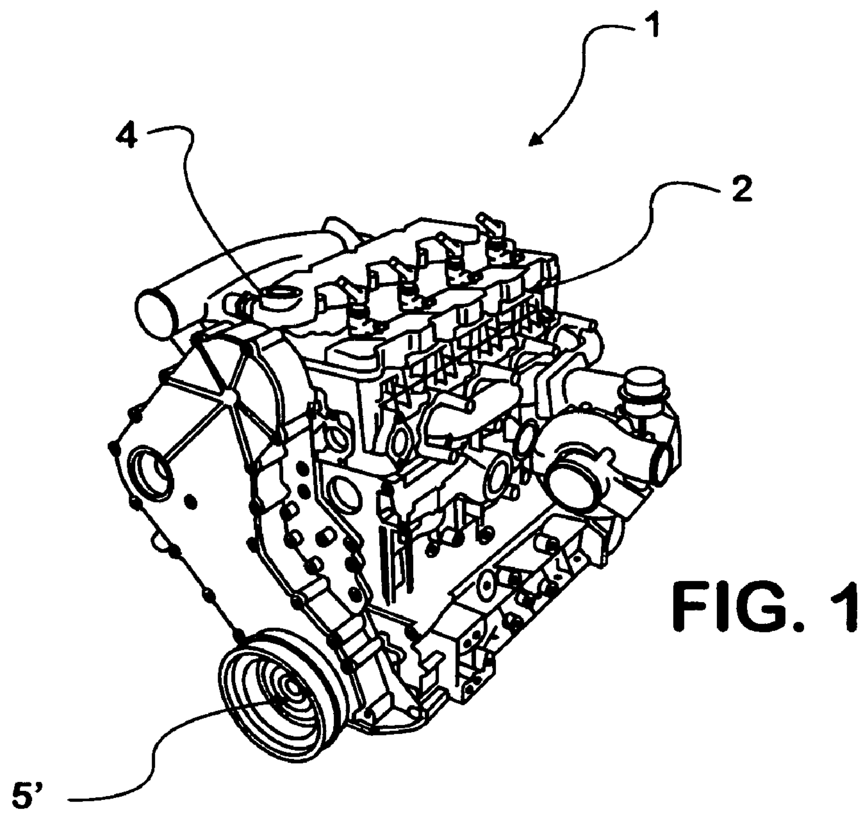
FIG. 1 illustrates a first embodiment of the internal combustion engine of the present invention.

FIG. 1 illustrates the preferred embodiment of the present invention, which in which the internal combustion engine 1 has a housing 2 with an motor-oil feed opening 4, which constitutes one of the accesses to the internal portion of the housing 2. Attention is called to the fact that, in this specification, the term housing means any housing that embraces the head(s) and/or the engine block.

The engine illustrated now has a turnable camshaft 5, positioned on the head, in an arrangement known to those skilled in the art as OHC (overhead camshaft), and a crankshaft (evidently turnable), designated in the figures with 5'. In this way, the camshaft is visible and easily reachable from the oil-feed opening 4.

Some engines, mainly the OHC-type ones, also have another turnable shaft (not shown), which is also associated to the crankshaft 5' in a synchronized manner, the main function of which is to move other engine components, whose synchronism are imperious (as, for instance, the distributor in the Otto-Cycle engines, or else fuel-injecting pumps). This turnable shaft is commonly known as intermediate shaft.

However, many engines still under production have another constructive scheme (not shown), wherein the camshaft is located at the engine block, adjacent to the crankshaft 5', instead of being positioned on the head (where the valves are positioned). This solution has lower costs. In this case, the valves are actuated by actuation rods and rockers, and the engine configured in this way is called OHV (overhead valve), or pushrod, engine.

This arrangement is particularly used on engines that work under the Diesel Cycle, since the maximum rotation reached, on the average, is considerably reduced in comparison with that reached by the Otto-Cycle engines, being generally lower than 4000 rotations per minute (there are exceptions, mainly among the Diesel engines of modern design and more reduced cubic capacity). With these low rotations, the mechanical losses due to the positioning of the camshaft on the block are not considerable.

Another advantageous situation for the positioning of the camshaft 5 on the block is found in the engines configured with the cylinders arranged in V, or else with opposed cylinders, which require two heads, with the need for two camshafts, if an OHC-type engine is aimed at. This causes a considerably higher cost of development, manufacture and maintenance of the product.

Figure 2:
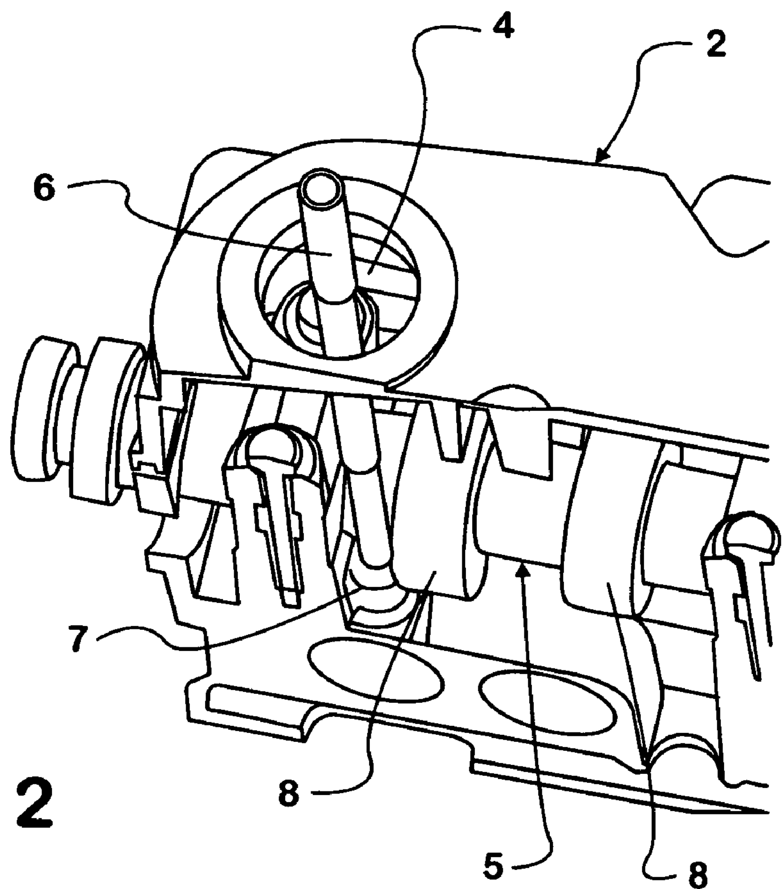
FIG. 2 illustrates a first view in detail of the internal portion of the engine illustrated in FIG. 1.

As shown in FIG. 2, a camshaft or cams 5 is mounted inside the housing 2, for rotation about its axis when the engine is working. Just to clarify the movements of the shaft 5, said rotation preferably takes place by means of an actuation made by a belt, chain(s), gears or any other known connection device (not shown), connected to the crankshaft 5' of the engine in a synchronized way, which, as already said, transmits a rotational movement.

The ratio between the rotation of the camshaft 5 and the crankshaft 5' is 1:2, that is to say, one rotation of the camshaft 5 corresponds to two rotations of the crankshaft 5'.

In addition, the camshaft 5, as the name itself defines, has the task of actuating the valves (not shown) that control the entry and exit of air/gas into/out of the combustion chambers (not shown either), when the combustion cycles are being effected, as well as maintaining them synchronized with the other components involved in this operation. In this way, one can see in FIG. 2 that the shaft 5 has cams 8 arranged in different positions (with respect to each other) along the shaft, so that each cam 8 will actuate a respective valve at a determined moment of the combustion cycles.

It is fundamental that the camshaft 5 be correctly synchronized with the other engine components (crankshaft 51, pistons, injection system, etc.), so that its cams 8 will cause the valves to function in a synchronized way with them and, consequently, allow the combustion cycles to be carried out correctly. Otherwise, when the shaft 5 is turning, its cams 8 actuate the valves at inadequate moments, permitting an incorrect entry or exit of gases into/out of the combustion chamber, thereby impairing or preventing the cycle from being carried out and, in the most severe cases, causing damages to the engine. Therefore, at the time of adjusting, repairing and/or replacing engine components, there is the need to prevent an inadvertent rotation of the camshaft 5 with respect to the crankshaft 5', which may entail an undesirable unsynchronized functioning of the valves.

In order to meet this need and achieve the objectives proposed herein, the present invention has a device 6 for locking a turnable shaft, which prevents rotation of the camshaft 5, when desired by a user, especially when there is a need to adjust, repair, dismount and/or replace engine components.

Figure 5:
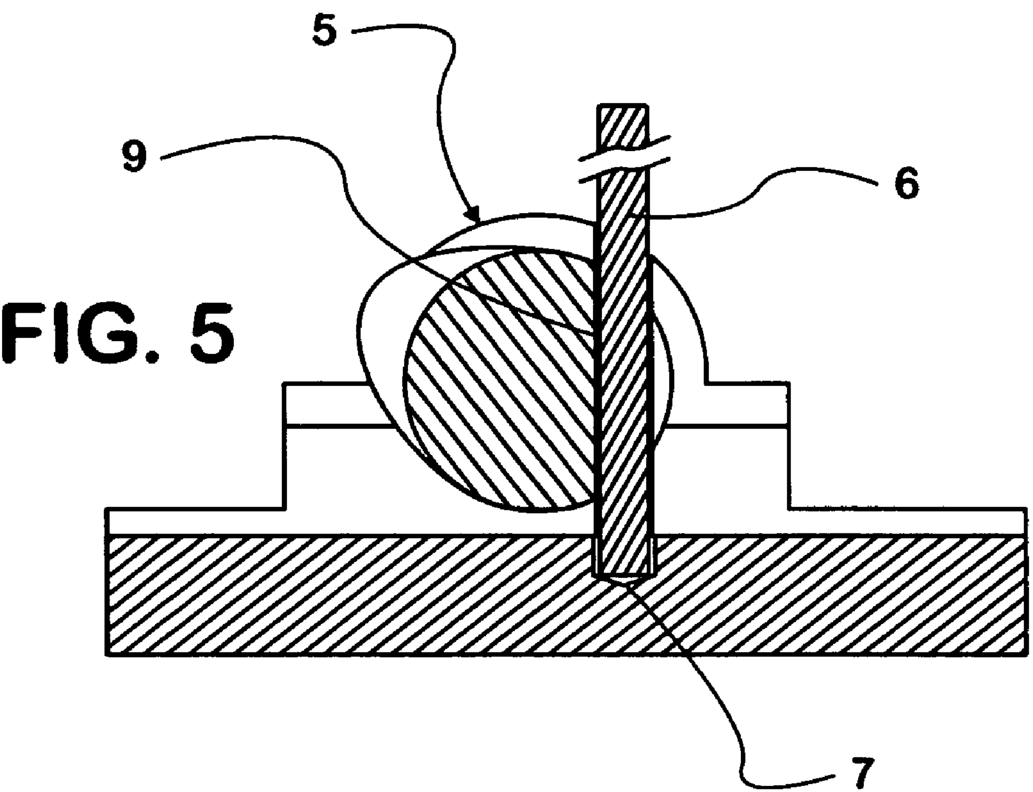
FIG. 5 illustrates a cross-section detailed view of the camshaft of the engine illustrated in FIGS. 1 to 4 when it is associated to a locking device.

As shown in FIGS. 2 to 5, the preferred embodiment of the present invention illustrates a device for locking a turnable shaft in the form of a locking rod 6 for locking the camshaft 5, inserted in a bore 7 located in the housing 2 (specifically at the head), through the oil-feed opening 4. The shaft 5 has a notch 9 (as can be seen in FIGS. 4 and 5), which cooperates with, and functions like, a stop against the rod 6. In this way, the rod 6 is inserted in the bore 7, the shaft 5 is prevented from turning and, therefore, from coming out of the aligned position with respect to the other engine components. The preferred shape of the notch 9 is that of a cut made in the surface of the shaft 5, defining a longitudinal plane surface that can cooperate with the rod 6.

Preferably, the notch 9 is designed in such a way that, when the shaft 5 is positioned so as to allow it (the notch 9) to cooperate with the rod 6 and the bore 7 (as shown in FIGS. 2-4), the engine 1 will present the piston of one of the cylinders (as a rule, the called first cylinder) positioned in the upper stroke position, that is to say, the point closest to the engine valves.

The rod 6 may be composed of any material that provides the adequate mechanical properties for it not to deform, break or be damaged when it is acting as a stop against the shaft 5. Preferably, one uses metallic alloys for making it, but any other material may be used, as long as they are functional.

The fitting of the rod 6 into the housing 2 is effected directly by the operator or mechanic that is responsible for the maintenance of the engine.

In the preferred embodiment of the invention, the fitting between the rod 6 and the bore 7 is made so as to guarantee that no considerable clearance will be left, so that the rod 6 can be kept upright, that is, to prevent it from inclining substantially when it is acting as a stop to the point of impairing the locking and synchronism of the shaft 5, and so that it will can be mounted manually without application of excessive force (which would cause difficulties, above all, for removing of the rod 6).

Notwithstanding, other embodiments might use bores with retentions means, such as threads, or even use fitting of non-circular geometry, without departing from the concept of the present invention. By the way, this concept is not limited to the utilization of rods associated to bores in the engine housing. So, other functional equivalent locking devices, such as, for example, locking plates, are also embraced, as long as they can be inserted through an opening in the engine housing.

The insertion of the locking rod 6 into the bore 7, through the oil-feed opening of the engine 1, is preferably carried out before the operation of adjusting, repair and/or replacing engine components, so as to prevent rotation of the shaft and a consequent disalignment of the valves with respect to the other engine components throughout this operation.

Figure 6:
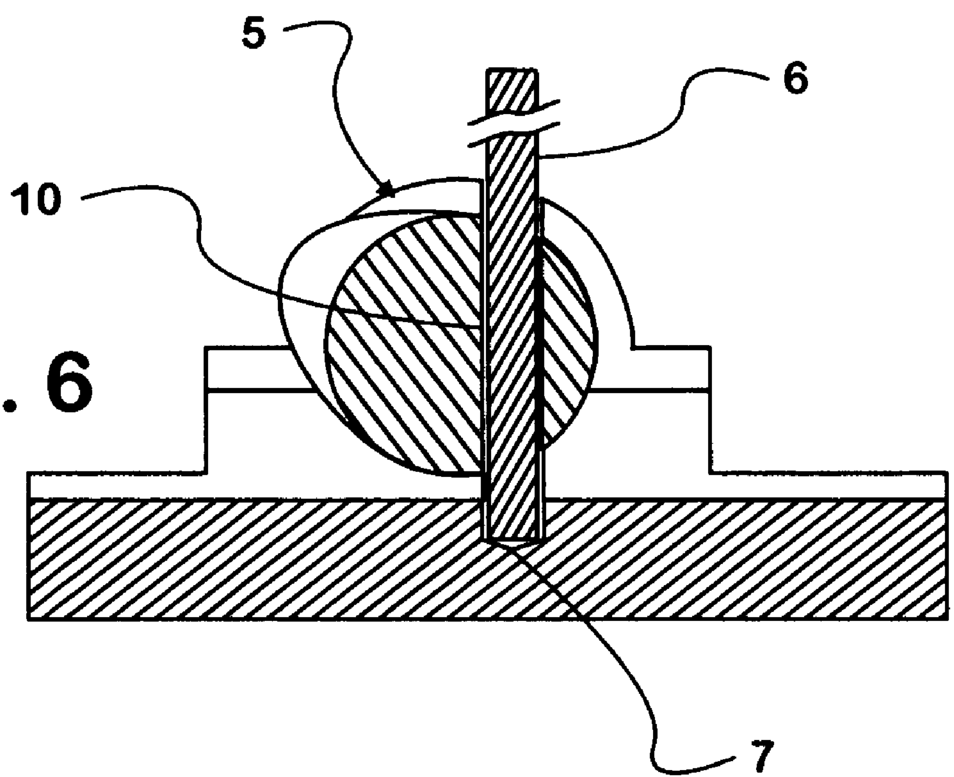
FIG. 6 illustrates a cross-section detailed of the camshaft of a second embodiment of the internal combustion engine of the present invention when it is associated to a locking device.

Another embodiment of the present invention is illustrated in FIG. 6, corresponding to a second embodiment of the engine of the present invention, in which the camshaft 5 comprises a bore or through bore 10 that goes through or radially past the shaft 5, so that, in order to lock it, the rod 6 has to pass through the bore 10 and be inserted into the bore 7. It is evident that one may also provide any other kind of notch 9, bore 10 or other cooperating locking means, as long as they are functional.

In the case of engines of OHV configuration, the opening 4 for positioning the rod 6 will not be the oil-feed opening (since it does not permit access to the camshaft 5), but, rather, other openings in the housing 2, such as oil drain plug, bores for positioning sensors (such as oil-pressure sensor, crankshaft-rotation sensor, water-temperature sensor, etc.), among others.

One can see that the present invention provides means for locking the camshaft 5 throughout the operations of adjusting, dismounting and/or replacing engine components, thus minimizing the chances of loss of synchronization between the valves and the other components of the engine 1.

Preferably, the engine housing 2 is an engine head and has means cooperating with the device for locking the turnable shaft 6, regardless of its configuration, in order to lock the camshaft 5 with respect to it. The other characteristics, such as configuration of the cooperating means, have already been described before.

Evidently, however, the housing 2 may be the engine block, mainly in the cases of OHV engines or when the shaft to be locked is the crankshaft or the intermediate shaft, and the cooperating means may be any ones, as long as they are functional.

One may also project the engine 1 of the present invention in such a way that it is possible to lock the crankshaft 5' or else the intermediate shaft, when it is necessary to repair adjacent regions/components (for example, oil pumps, connecting-rods, bearings or crankshaft retainers, crankshaft pulleys, water pumps, etc.), which might lead to undesirable angular movements of the crankshaft 5/intermediate shaft, which would end up causing loss of synchronization with the camshaft 5. In other words, in determined situations it is possible to move, in a not desired way, the crankshaft 5' or the intermediate shaft without moving the camshaft 5, configuring a loss of synchronization equivalent to that which occurs when the camshaft 5 is moved.

The devices for locking the crankshaft 5' or the intermediate shaft may be identical to those used for locking the camshaft 5, such as notch 9 or bore 10 and a rod 6, or else any others, provided that they are functional.

Although the above embodiments refer to an engine that performs the Diesel Cycle, the concept of the present invention also embraces engines that perform other cycles, as for example the Otto Cycle.

Figure 7:
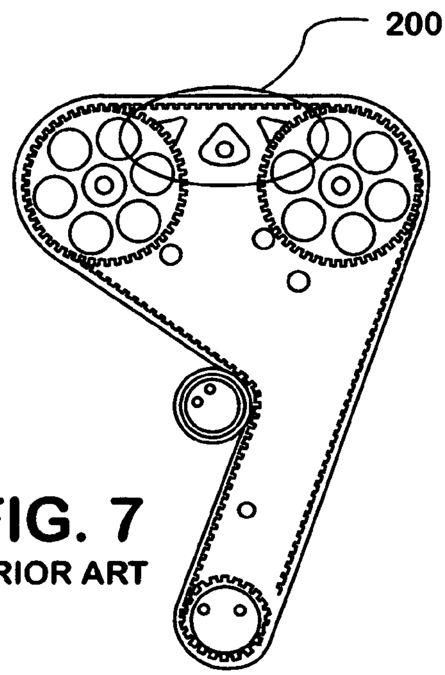
FIG. 7 illustrates a first view of an engine of the prior art, wherein the alignment/synchronism between the shafts is maintained by means of visual markings.
Figure 8:
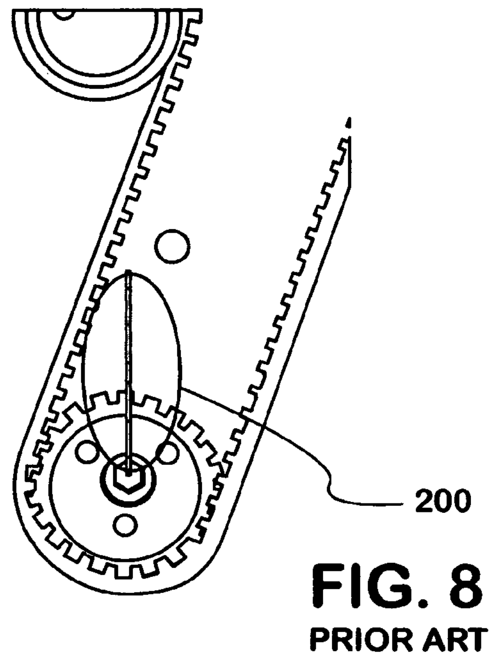
FIG. 8 illustrates a second view of the engine of the prior art illustrated in FIG. 7.
Figure 9:
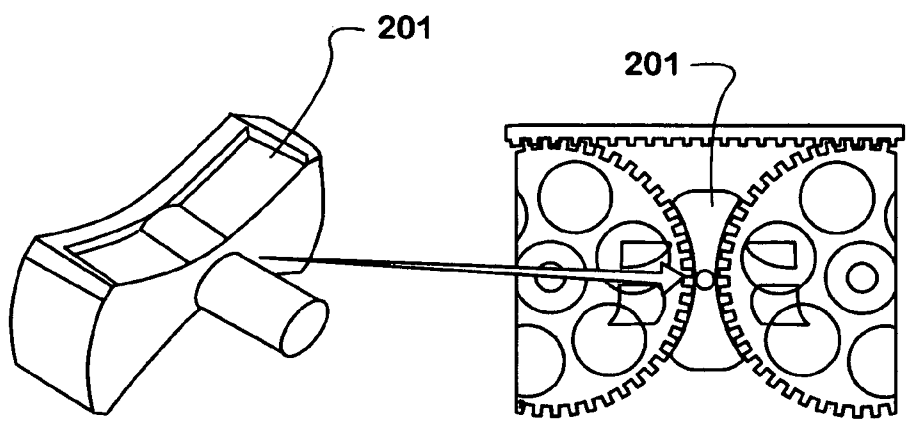
FIG. 9 illustrates a partial view of the camshaft of an engine of the prior art, wherein the synchronism between the shafts is maintained by means of a pulley-locking device.

Just by way of illustration, FIGS. 7 to 9 refer to engines of the prior art. Particularly, FIGS. 7 and 8 disclose an engine where the synchronism between shafts is maintained by means of visual markings 200, and FIG. 9 discloses an engine where the locking device comprises a piece 201 that locks the pulleys of the two camshafts, preventing it from moving. The disadvantages of these two systems have already been commented in the beginning of this specification.

Thus, it should be understood that the scope of the present invention embraces any other possible variations, being limited only by the contents of the accompanying claims, which include the possible equivalents.

The invention claimed is:

1. An internal combustion engine comprising a housing having a motor-oil feed opening to its inside and a camshaft mounted on the inside of the housing; the engine being characterized in that a part inside the housing has a locator receiving and locating a device inserted into the inside of the housing through the motor-oil feed opening with circumferential clearance to the opening to associate the device with a surface of the camshaft and through that association cause the device to lock the camshaft against rotation.

2. An internal combustion engine comprising a housing having an opening to an interior that is enclosed at least in part by the housing and within which is disposed a shaft that rotates when the engine operates; the engine being characterized in that a part of the engine that is disposed beyond the shaft relative to the opening has a locator for receiving and locating a device inserted into the interior of the housing through the opening to associate the device with a surface of the shaft when the shaft is in a particular position of rotation and through that association cause the device to lock the shaft against rotation from that particular position, characterized in that the device comprises a rod and the surface of the shaft comprises a planar surface of a notch in the shaft, the rod having a surface disposed against the planar surface.

3. An internal combustion engine according to claim 2, characterized in that the locator comprises a bore in the part into which a distal end of the rod is inserted.

* * * * *